United States Patent
Larlus et al.

(10) Patent No.: US 8,489,585 B2
(45) Date of Patent: Jul. 16, 2013

(54) EFFICIENT DOCUMENT PROCESSING SYSTEM AND METHOD

(75) Inventors: Diane Larlus, La Tronche (FR); Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/331,096

(22) Filed: Dec. 20, 2011

(65) Prior Publication Data
US 2013/0159292 A1    Jun. 20, 2013

(51) Int. Cl.
G06F 7/00    (2006.01)
G06F 17/30    (2006.01)

(52) U.S. Cl.
USPC .......................................... 707/723; 382/190

(58) Field of Classification Search
USPC .................. 707/723; 382/173–180, 190, 195, 382/205, 206
See application file for complete search history.

(56) References Cited

U.S. PATENT DOCUMENTS

| | | | |
|---|---|---|---|
| 8,265,400 B2 * | 9/2012 | Yadid et al. | 382/229 |
| 2002/0018071 A1 * | 2/2002 | Ohnishi et al. | 345/643 |
| 2003/0021481 A1 | 1/2003 | Kasutani | |
| 2005/0063579 A1 * | 3/2005 | Lee et al. | 382/131 |
| 2005/0180627 A1 * | 8/2005 | Yang et al. | 382/159 |
| 2006/0062470 A1 * | 3/2006 | Zhu et al. | 382/186 |
| 2006/0088187 A1 * | 4/2006 | Clarkson et al. | 382/103 |
| 2006/0171559 A1 * | 8/2006 | Rhoads | 382/100 |
| 2007/0003147 A1 * | 1/2007 | Viola et al. | 382/229 |
| 2007/0005356 A1 | 1/2007 | Perronnin | |
| 2007/0112709 A1 * | 5/2007 | Luo | 706/45 |
| 2007/0248249 A1 * | 10/2007 | Stoianov | 382/124 |
| 2007/0258648 A1 | 11/2007 | Perronnin | |
| 2008/0008396 A1 * | 1/2008 | Kisilev et al. | 382/272 |
| 2008/0069456 A1 | 3/2008 | Perronnin | |
| 2008/0205717 A1 * | 8/2008 | Reeves et al. | 382/128 |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2009/0290754 A1 * | 11/2009 | Rhoads | 382/100 |
| 2010/0040285 A1 * | 2/2010 | Csurka et al. | 382/170 |
| 2010/0082615 A1 | 4/2010 | Clinchant et al. | |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0318477 A1 | 12/2010 | Perronnin et al. | |
| 2011/0026831 A1 | 2/2011 | Perronnin et al. | |

(Continued)

OTHER PUBLICATIONS

U.S. Appl. No. 12/859,898, filed Aug. 20, 2010, Perronnin et al.

(Continued)

Primary Examiner — Robert Beausoliel, Jr.
Assistant Examiner — Nicholas Allen
(74) Attorney, Agent, or Firm — Fay Sharpe LLP

(57) ABSTRACT

A document processing system and method are disclosed. In the method local scores are incrementally computed for document samples, based on local features extracted from the respective sample. A global score is estimated for the document based on the local scores currently computed, i.e., on fewer than all document samples. A confidence in a decision for the estimated global score is computed. The computed confidence is based on the local scores currently computed and, optionally, the number of samples used in computing the estimated global score. A classification decision, such as a categorization or retrieval decision for the document is output, based on the estimated score when the computed confidence in the decision reaches a threshold value.

26 Claims, 5 Drawing Sheets

U.S. PATENT DOCUMENTS

| | | | |
|---|---|---|---|
| 2011/0040711 A1 | 2/2011 | Perronnin et al. | |
| 2011/0091105 A1 | 4/2011 | Perronnin | |
| 2011/0103648 A1* | 5/2011 | Wiedemann et al. | 382/103 |
| 2011/0137898 A1 | 6/2011 | Gordo et al. | |
| 2011/0211762 A1* | 9/2011 | Carter et al. | 382/209 |
| 2012/0027290 A1* | 2/2012 | Baheti et al. | 382/154 |
| 2012/0230546 A1* | 9/2012 | Hua et al. | 382/103 |
| 2012/0275677 A1* | 11/2012 | Bower et al. | 382/131 |

OTHER PUBLICATIONS

U.S. Appl. No. 12/890,789, filed Sep. 27, 2010, Sanchez et al.

Harris et al. "A combined corner and edge detector", Proc. of the Fourth Alvey Vision Conference, 1988, pp. 147-151.

Jegou, et al. "Aggregating local descriptors into a compact image representation", CVPR'10, 2010, pp. 3304-3311.

Marchesotti, et al. "A framework for visual saliency detection with applications to image thumbnailing", 2009 IEEE, $12^{th}$ Intl. Conf. on Computer Vision, pp. 1-8.

Maree, et al. "Random subwindows for robust image classification", CVPR, 2005 IEEE, pp. 1-7.

Moosmann, et al. "Learning saliency maps for object categorization", ECCV Intl. Workshop on the Representation and Use of Prior Knowledge in Vision, 2006, pp. 1-14.

Perronnin, et al. "Improving Fisher Kernel for large-scale image classification", ECCV, 2010, pp. 143-156.

Perronnin, et al. "Fisher Kernels on visual vocabularies for image categorization", CVPR, 2007, pp. 1-8.

Zhou, et al. "Image classification using super-vector coding of local image descriptors", ECCV, 2010, pp. 1-14.

* cited by examiner

EFFICIENT DOCUMENT PROCESSING SYSTEM AND METHOD

BACKGROUND

The exemplary embodiment relates to document classification and is described with illustrative reference to retrieval and categorization applications. It is to be appreciated that it may find application in numerous other applications entailing comparison, retrieval, categorization, and the like.

Many automated document processing tasks involve assigning one (or multiple) score(s) to a given document and then taking a decision by comparing the score(s) to a threshold. For example, document classification generally involves computing the relevance of a class with respect to a document, based on the content of the document (e.g., "is it probable that this photographic image contains a cat?" or "is it probable that this text document is relevant to a particular litigation matter?") As another example, document retrieval generally involves computing a matching score between a query document and a set of database documents (e.g., "find the most similar images to this image of a dog").

In most cases, the scoring process can be subdivided into two steps. In a first step, a global representation X of the document is computed. In a second step, a global score Y=f (X) is computed, based on the global representation. The first of these steps is typically the most computationally intensive one. Reducing its cost would therefore be desirable.

In the case of document classification, for example, various text and image classification techniques have been developed. For text classification, a text document can be classified as follows. First, an optical character recognition (OCR) engine is used to extract low-level features of the document, which in this case may be all the words in the document. Then, the document is described using a bag-of-words (BoW) histogram by counting the number of occurrences of each of a predetermined set of words. The histogram serves as the global representation of the document. The global representation is fed to a classifier which computes a score associated to a classification label. The score can be compared with a threshold to determine if the label is appropriate for the document. In general, successful text classifiers combine a linear support vector machine (SVM) classifier with high-dimensional representations. In this example, the OCR step is by far the most CPU-intensive step. For example, it may take several seconds per page, especially in the case of difficult documents such as noisy documents or documents with non-standard fonts. Comparatively, the cost of the rest of the processing is insignificant.

In the case of image classification, an image may be classified as follows. First, a predefined set of samples (i.e., local image sub-regions or "patches") are selected. Patch descriptors (e.g., color or gradient descriptors) are extracted from each patch based on low level features and subsequently quantized into visual words. A local descriptor, such as a bag-of-visual-words (BoV) histogram, is then computed by counting the number of occurrences of each visual word. Separate histograms can be generated for each type of descriptor and then aggregated. The histogram serves as the global representation (global descriptor) of the document. The classification can then proceed as for text documents. The most computation intensive steps, by far, are the sample description and quantization. The cost of the rest of the processing method is insignificant.

In the case of document retrieval, the computation of the global descriptor of each document (text or image) to be compared is analogous and is also more computationally expensive than the steps of comparison and retrieval of similar documents.

The exemplary embodiment enables document classification tasks, such as categorization and retrieval, to be performed more efficiently by estimating the global score prior completion of the first, more computationally expensive step, and determining whether the estimated score is sufficiently reliable to be the basis of a classification decision.

INCORPORATION BY REFERENCE

The following references, the disclosures of which are incorporated by reference, are mentioned:

Methods for generating descriptors for images based on visual features extracted from patches of an image are disclosed, for example, in U.S. application Ser. No. 12/859,898, filed on Aug. 20, 2010, entitled LARGE SCALE IMAGE CLASSIFICATION, by Florent Perronnin, et al., Other methods of extracting features from document images are described U.S. Pub. Nos. 20030021481; 2007005356; 20070258648; 20080069456; 20080240572; 20080317358; 20090144033; 20100040285; 20100098343; 20100191743; 20100189354; 20100318477; 20110040711; 20110026831; 20110091105; U.S. application Ser. No. 12/890,789, filed on Sep. 27, 2010, entitled IMAGE CLASSIFICATION EMPLOYING IMAGE VECTORS COMPRESSED USING VECTOR QUANTIZATION, by Jorge Sanchez, et al., Perronnin, F., Dance, C., "Fisher Kernels on Visual Vocabularies for Image Categorization," in Proc. of the IEEE Conf. on Computer Vision and Pattern Recognition (CVPR), Minneapolis, Minn., USA (June 2007); Herve Jegou, Matthijs Douze, and Cordelia Schmid, "Improving Bag-Of-Features for Large Scale Image Search," in IJCV, 2010; F. Perronnin, J. Sanchez, and T. Mensink, "Improving the fisher kernel for large-scale image classification," in ECCV 2010, among others. Methods for generating representations of documents based on runlength histograms are disclosed, for example, in U.S. Pub. No. 20100092084, published Apr. 15, 2010, entitled REPRESENTING DOCUMENTS WITH RUN-LENGTH HISTOGRAMS, by Perronnin.

Methods for generating representations of documents based on textual features are described, for example, in U.S. Pub. No. 20100082615, published Apr. 1, 2010, entitled CROSS-MEDIA SIMILARITY MEASURES THROUGH TRANS-MEDIA PSEUDO-RELEVANCE FEEDBACK AND DOCUMENT RERANKING, by Clinchant, et al., and U.S. Pub. No. 20110137898, published Jun. 9, 2011, entitled UNSTRUCTURED DOCUMENT CLASSIFICATION, by Albert Gordo, et al.; and in G. Salton and M. McGill, Introduction to Modern Information Retrieval, McGraw-Hill, 1983.

BRIEF DESCRIPTION

In accordance with one aspect of the exemplary embodiment, a document processing method includes incrementally, for each of a set of samples of a document, computing a local score based on local features extracted from the sample. A global score for the document is estimated, based on the local scores currently computed. A confidence in a decision is computed for the estimated global score, the computed confidence being based on the local scores currently computed and, optionally, on a number of the samples used in computing the estimated global score. A decision for the document based on the estimated score is output when the computed confidence in the decision reaches a threshold value.

In another aspect, a document processing system includes a descriptor generator which, progressively, for each of a set of samples of a document, generates a local descriptor based on features extracted from the sample of the document, a scoring component which incrementally estimates a global score for the document based on the local descriptors currently computed for the set of samples of the document, a confidence computing component which computes a confidence in a decision for the estimated global score, the computed confidence being based on the local descriptors currently computed and a number of the samples used in computing the estimated global score, and a decision output component which outputs a decision for the document based on the estimated score when the computed confidence in the decision reaches a threshold value. A processor implements the descriptor generator, scoring component, confidence computing component, and decision output component.

In another aspect, a document processing system is provided which takes as input a document and outputs a decision when an estimate of the document score is higher than a threshold ϵ or lower than a threshold −ϵ. The estimated document score is computed as an aggregation of local scores computed from local features. The local features and scores are computed incrementally and used to compute a confidence in the decision. The extraction of the local features and local score computation is discontinued as soon as the computed confidence in the decision exceeds a threshold α.

DETAILED DESCRIPTION

Aspects of the exemplary embodiment relate to a computer implemented system and method for computing an estimate of a global score for a document, based on local feature descriptors, and outputting a decision based thereon when a confidence in that decision has reached a threshold, avoiding the need to extract further local descriptors from the document.

The present system and method are based on the assumption that it may not be necessary, at least in some cases, to extract all the local descriptors (and to compute all the local scores based thereon) to take a decision. Instead of computing the global descriptor and the global score in two consecutive steps, these two tasks may be performed concurrently in the exemplary method. More precisely, an estimate of the global score can be computed from a subset of the local descriptors (and/or their associated local scores). The subset of local descriptors is increased progressively and the estimate of the global score is updated efficiently in an online fashion. The process can thus be stopped as soon as the estimate of the global score is reliable enough, e.g., when there is a 99% confidence about the decision. Consequently, the cost of extracting the remaining local descriptors and computing the related scores is saved. Therefore, a significant benefit of the exemplary system and method lies in the computational cost saving.

In what follows, the term "document" encompasses different types of media including text, image, and audio documents, and combinations of these. Particular reference is made to the processing of text documents and documents comprising one or more images, such as photographs, by way of example.

Figure 1:
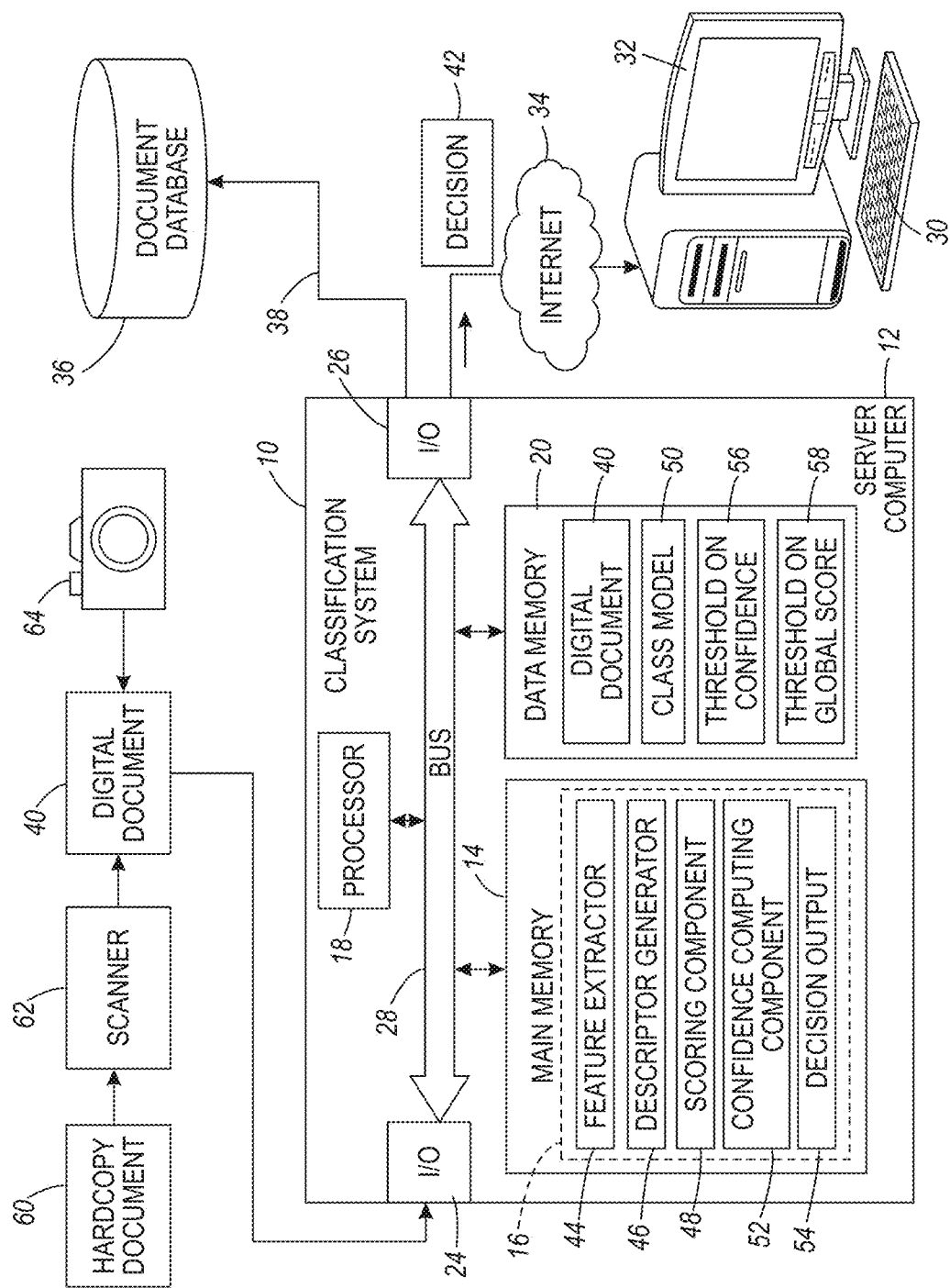
FIG. 1 is a functional block diagram of a classification system in accordance with one aspect of the exemplary embodiment.

With reference to FIG. 1, an exemplary environment in which a classification system 10 operates is illustrated. The system 10 may be adapted for various types of classification tasks, such as categorization or retrieval. The classification system 10 is in the form of one or more computing devices 12 and includes main memory 14 which stores instructions 16 for performing the exemplary method and a processor 18, such as the computer's CPU, in communication with the memory 14, for executing the instructions. In the case of a categorization system, data memory 20 of the computing device stores one or more class models 22. The computing device 12 includes one or more input/output devices 24, 26 for communication with external devices. Hardware components 14, 18, 20, 24, 26 of the system communicate via one or more data/control buses 28. The system 10 may receive user inputs from a user input device 30, such as a keyboard, keypad, touch screen, cursor control device, or combination thereof, and may output information to a display device 32, such as a computer monitor, or to external memory. As will be appreciated, the user input and display devices 30, 32 may be associated with a client computing device that is linked to the computer 12 via a network, such as a wired or wireless network 34, or may be linked directly to the computer 12, by wired or wireless connections. For performing retrieval tasks, the system 10 may have access to a database 36 of documents (or to precomputed global representations of the documents). Database 36 may be stored in memory 20 and/or in remote memory accessible via a link 38, such as a wired or wireless network, e.g., the Internet.

The system 10 receives as input a document 40 to be processed, which may be stored in memory 20 during processing. The system outputs a decision 42 based on features extracted from the document. Briefly, a features extractor 44 extracts features from the document (e.g., words in the case of an OCR engine, or color/gradient features in the case of an image feature extractor). The features extractor 44 is configured for extracting the features progressively, such as from samples (e.g., patches or word images) of the input document 40. For each sample, a descriptor generator 46 generates a local descriptor, which is a representation of the sample, based on the extracted features. For example, histograms of word counts in the case of text documents, or histograms of visual word counts in the case of images can be used as local descriptors, as noted above. A scoring component 48 generates an estimate of a global score based on the local descriptors generated so far. In the case of categorization, the estimated global score is generated using one or more pretrained class models 50. In the case of categorization, the estimated global score is generated using one or more similarly generated global descriptors of other documents from database 36. As will be appreciated, the global score is the score for the document which would be generated if all samples were used. The estimate of the global score is thus based on a subset of the samples, i.e., fewer than all patches are generally used. A confidence component 52 determines whether a threshold confidence level has been reached for outputting a decision 42 based on the estimated global score. If the confidence level has been reached, a decision output component 54 outputs the decision and it calls on the feature extraction component 44 to discontinue features extraction. Otherwise, features extraction by the features extractor 44 continues, such that local descriptors are generated by the descriptor generator 46 for one or more additional patches. Thresholds 56, 58 on the confidence level and global score estimate may be predetermined and stored in memory. As will be appreciated, for a binary decision, two thresholds on the global score estimate may be established, one for the positive label and one for the negative label.

The system is not limited to any particular type of low level features, local descriptors, or class model 50. For many document processing tasks, the global descriptor of a document can be an aggregation of local descriptors, such as a sum, mean, or the like. This is the case for bags, as in the BoW representation of text documents and in the BoV representation of images. The present system and method can accommodate other local descriptors for samples of a document which are averages of local statistics. These include the Fisher Vector (FV) (F. Perronnin and C. Dance, "Fisher kernels on visual vocabularies for image categorization," in CVPR, 2007), the Vector of Locally Aggregated Descriptors (VLAD) (H. Jegou, M. Douze, C. Schmid, and P. Pérez, "Aggregating local descriptors into a compact image representation," in CVPR, 2010), and the Super-Vector (SV) (Z. Zhou, K. Yu, T. Zhang, and T. Huang, "Image classification using super-vector coding of local image descriptors," in ECCV, 2010), among others noted above.

In the exemplary embodiment, the global score can be an aggregation (e.g., mean) of local scores computed on each of the local descriptors.

To take a decision 42, in the exemplary embodiment, it is not necessary to know the exact global score but just whether the estimated global score has reached (e.g., exceeds or is below) a given threshold. For example, in a classification task, the aim is to ensure that the estimated classification score is higher than a pre-defined threshold in order to assign a particular label to a document. In a retrieval task, the aim is to ensure that the similarity (estimated similarity score) is above a threshold to declare a match between two documents.

The document 40 to be processed may be a text document, e.g., a scanned copy of a hardcopy document 60, which is output by a scanner 62, or a photographic image, captured by an image capture device 64, such as a camera, medical imaging device, or the like. Documents may be received by the system 10 in any convenient file format, such as JPEG, GIF, JBIG, BMP, TIFF, PDF, or the like or other common file format used for photographic images or text document images and which may optionally be converted to another suitable format prior to processing. Input documents may be stored in data memory 20 during processing. The documents may be individual images, such as scanned document images, photographs, video images, or combined images which include photographs along with text, and/or graphics, or the like. In general, each document image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). Image data may be binarized (converted to black and white) prior to feature extraction (particularly in the case of text documents).

The documents 40 can be input to the system 10 from any suitable external source, such as a scanner, workstation, database, memory storage device, such as a disk or flash memory, or the like, and may be stored in memory 20 during processing. The computing device 12 may be linked, via a wired or wireless link 34 from input/output device(s) 24, 26, to one or more external computing devices from which documents are received and/or to which labeled/retrieved documents are output.

The computing device 12 may include one or more specific or general purpose computers, such as a server computer, PC, such as a desktop, a laptop, tablet, or palmtop computer, a portable digital assistant (PDA), mobile phone, or other computing device capable of performing one or more of the exemplary methods disclosed herein. In some embodiments, the system 10 may be partly resident on a client device in communication with computing device 12.

The digital processor 18 can be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2 and/or 3, can be used as the processor. The memory or memories 14, 20, which may be separate or combined, may represent any type of non-transitory computer readable medium such as random access memory (RAM), read only memory (ROM), magnetic disk or tape, optical disk, flash memory, or holographic memory. In one embodiment, the memory 14, 20 comprises a combination of random access memory and read only memory. Exemplary memory 14, 20 stores instructions for performing the exemplary method and data used and generated therein, as well operating instructions for operating the computer 12.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
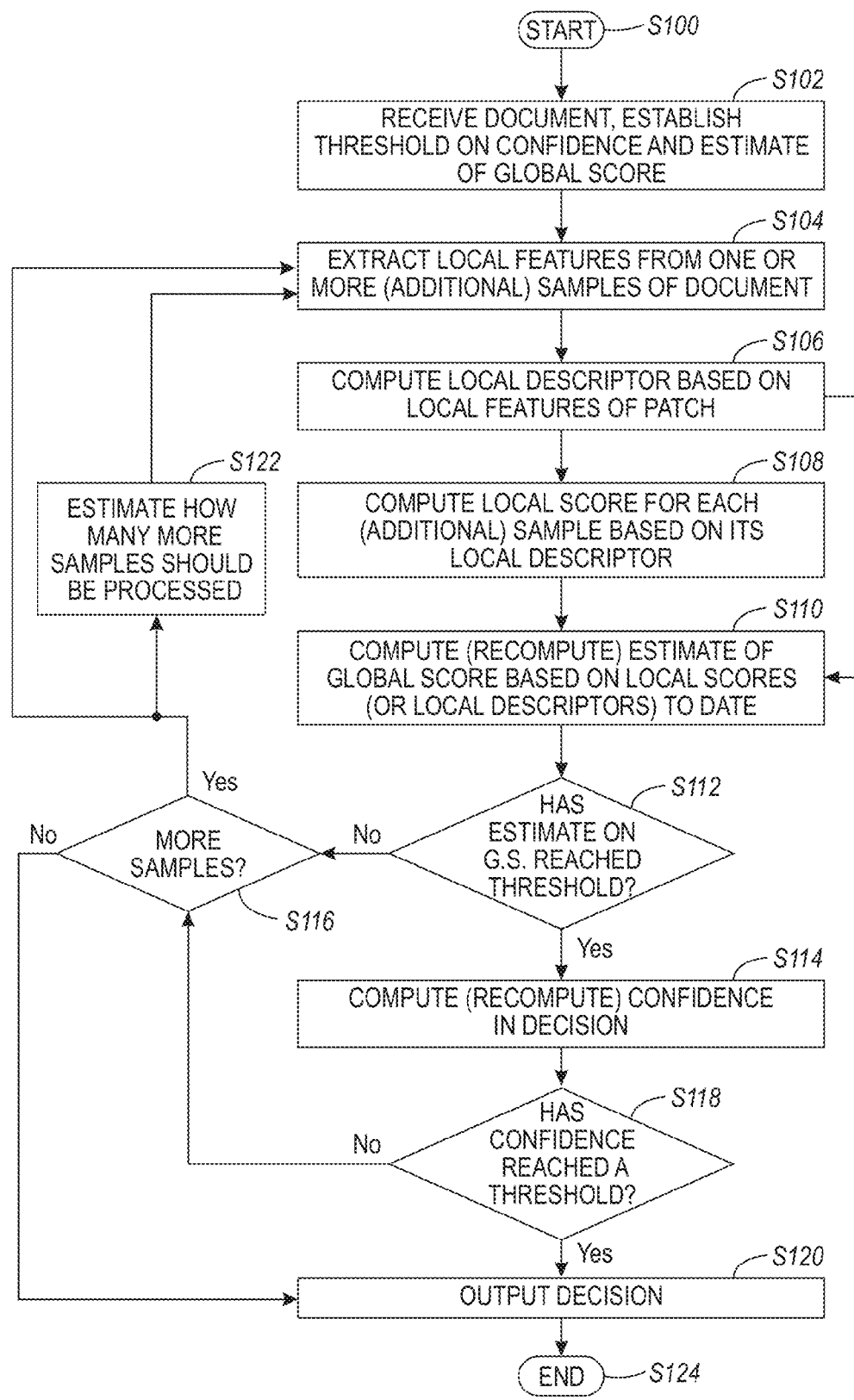
FIG. 2 is a flow chart illustrating an efficient classification method in accordance with another aspect of the exemplary embodiment.

FIG. 2 illustrates an exemplary classification method. The method begins at S100. At S102, a document 40 to be processed is received into memory 20 of the system 10. Some preprocessing of the document may have been performed such as removal of skew (particularly in the case of text documents), changing, e.g., reducing the pixel resolution, identification of samples (such as identification of the locations of samples, such as word boundaries or lines of text in the case of text documents, or use of interest point detectors or a grid in the case of patches of images) and the like. At this stage also, one or more topping criteria based on thresholds 56, 58 on confidence level and estimate global score may be established and stored, if they have not previously been.

At S104, one or more samples are selected for processing and local features are extracted from them. These samples may be drawn randomly throughout the document or in a predefined order. Thus, local features are extracted from only a subset of a set of possible samples covering the document. As will be appreciated, while it is possible for an estimate of the global score to be computed on the basis of a single sample, in practice, several samples may be processed.

At S106, for each patch, a local descriptor is generated, based on the extracted local features, such as a BoV or BoW.

At S108, a local score may be computed for each patch, based on the local descriptor computed at S106.

At S110, an estimate of the global score is computed, based on the local scores (or simply on the local descriptors) computed to date.

At S112, if the global estimate has reached the threshold value 58 (established at S102), the method proceeds to S114, otherwise to S116.

At S114, a confidence in the decision is computed.

At S118, if the confidence in the decision has reached the threshold value 56 (established at S102), the method may proceed to S120, where the decision is output, otherwise to S116.

At S116, if there are more samples to be processed, the method returns to S104, where one or more additional samples are processed, local descriptors and local scores computed for these additional samples (S106, S108), and a new estimate of the global score computed at S108. Methods for reducing the computation involved in this latter step are described below.

In some embodiments, an estimate of the number of additional samples which should be processed before another estimate of the global score is determined may be computed at S122, i.e., prior to returning to S104.

At S116, if there are no more samples to be processed, the method may proceed to S120, where a decision is output. In this case, the "decision" may simply be a recognition that no decision can be reached, in terms of the classification or retrieval, based on all of the samples in the document, such as class: "unknown". Other stopping criteria may of course be applied, such as at 80% or 90% or 95% of the document samples.

The method ends at S124.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2 can be used to implement the exemplary document processing method.

In the following, further details are provided on the application of the exemplary method to the categorization of documents, by way of example. The documents are represented using BoW local descriptors for text documents or BoV local descriptors for images, for ease of description, bearing in mind that these types of local descriptor are in no way limiting. As the classifier model 50, a single binary classifier is used by way of example, but the exemplary method can be readily extended to multiple classes.

Principles

A document 40 is described by a global descriptor X, which is an aggregation of local descriptors $x_t$. As an example, consider the case where the aggregation operation is the average, i.e.:

$$X = \frac{1}{T}\sum_{t=1}^{T} x_t. \quad (1)$$

where T represents the number of samples.

In the BoW and BoV examples, $x_t$ can be a binary histogram computed from a sample, which can be a single word or a region of an image. The histogram can have a single non-zero entry corresponding to the index of the word/visual word.

Let Y=f(X) represent the global score of the document 40 and assume that f(X) is a linear operation. In what follows, it is assumed that f(X) is of the form: f(X)=w'X+b (where ' denotes the transposition). In such a case:

$$Y = \frac{1}{T}\sum_{t=1}^{T} y_t, \quad (2)$$

with $y_t=f(x_t)$, i.e., the global score of the document can be computed as an average of the local scores $y_t$ computed based on the actual local descriptors $x_t$ extracted from the document. In the classification case, this corresponds to a linear classifier. In the retrieval case, this corresponds to a dot-product similarity and b=0.

Conventionally, classification systems first compute all local descriptors $x_t$, aggregate them into X, and then compute the global score Y as a function of X. In the exemplary method, the aim is to save some of the descriptor extraction cost. After each local descriptor extraction (or at other intervals, as discussed below) (S106), an estimate (approximation) of the global score is computed, using the available local scores (S110). A decision is made whether to stop that iterative process, or not. One method for solving this in one aspect of the exemplary embodiment is described below.

Confidence Interval and Threshold on Global Score

To compute the confidence in the decision, certain assumptions (approximations) can be made, which have been found to provide good results. First, it can be assumed that, for a given document 40 (e.g., an image), the random variables $Y_t$ modeling the local scores $y_t$ follow a normal distribution of mean $\mu$ and variance $\sigma^2$: $Y_t \sim N(\mu,\sigma)$. It is also assumed that the $Y_t$'s are independent and identically distributed (iid) random variables.

The estimation of the global score is thus equivalent to the estimation of the mean $\mu$. It is assumed that there has been access to T observations (samples) so far. Then, the sample estimate $\overline{Y}_T$ of $\mu$ is given by:

$$\bar{Y}_T = \hat{\mu} = \frac{1}{T}\sum_{t=1}^{T} f(x_t) = \frac{1}{T}\sum_{t=1}^{T} y_t. \qquad (3)$$

The unbiased estimate of the variance (square of standard deviation) is defined as:

$$\bar{S}_T^2 = \frac{1}{T-1}\sum_{t=1}^{T}(y_t - \bar{Y}_T)^2 \qquad (4)$$

When estimating the mean of a set of observations that can reasonably be expected to have a normal distribution, the t-student distribution can be used to predict a confidence interval and an associated probability for the value of the mean $\mu$ using the estimated mean $\bar{Y}$ and estimated variance $\bar{S}_T$ (see http://en.wikipedia.org/wiki/student%27s_t-distribution).

By definition, the following distribution:

$$\mathcal{T}_T = \frac{\bar{Y}_T - \mu}{\bar{S}_T/\sqrt{T}} \qquad (5)$$

is a t-student distribution with T−1 degrees of freedom. Suppose the number A>0 is defined such that $p(-A<\mathcal{T}_T<A)=\alpha$ (which means that the probability of $\mathcal{T}_T$ being within the interval of ±A is a fixed value $\alpha$). In what follows, A is represented by $A(\alpha,T)$ to denote its dependence on $\alpha$ and T. Then:

$$p\left(-A(\alpha,T) < \frac{\bar{Y}_T - \mu}{\bar{S}_T/\sqrt{T}} < A(\alpha,T)\right) = \alpha, \qquad (6)$$

and this is equivalent to:

$$p\left(\bar{Y}_T - A(\alpha,T)\frac{\bar{S}_T}{\sqrt{T}} < \mu < \bar{Y}_T + A(\alpha,T)\frac{\bar{S}_T}{\sqrt{T}}\right) = \alpha. \qquad (7)$$

Therefore, the interval whose endpoints are:

$$\bar{Y}_T \pm A(\alpha,T)\frac{\bar{S}_T}{\sqrt{T}} \qquad (8)$$

is an $\alpha$-percent confidence interval for $\mu$.

The assumption that the distribution is a normal (Gaussian) distribution has been confirmed for image samples, thus the t-student distribution is applicable. However, other distributions, such as Laplacian distributions are also contemplated.

Early Stopping

Figure 3:
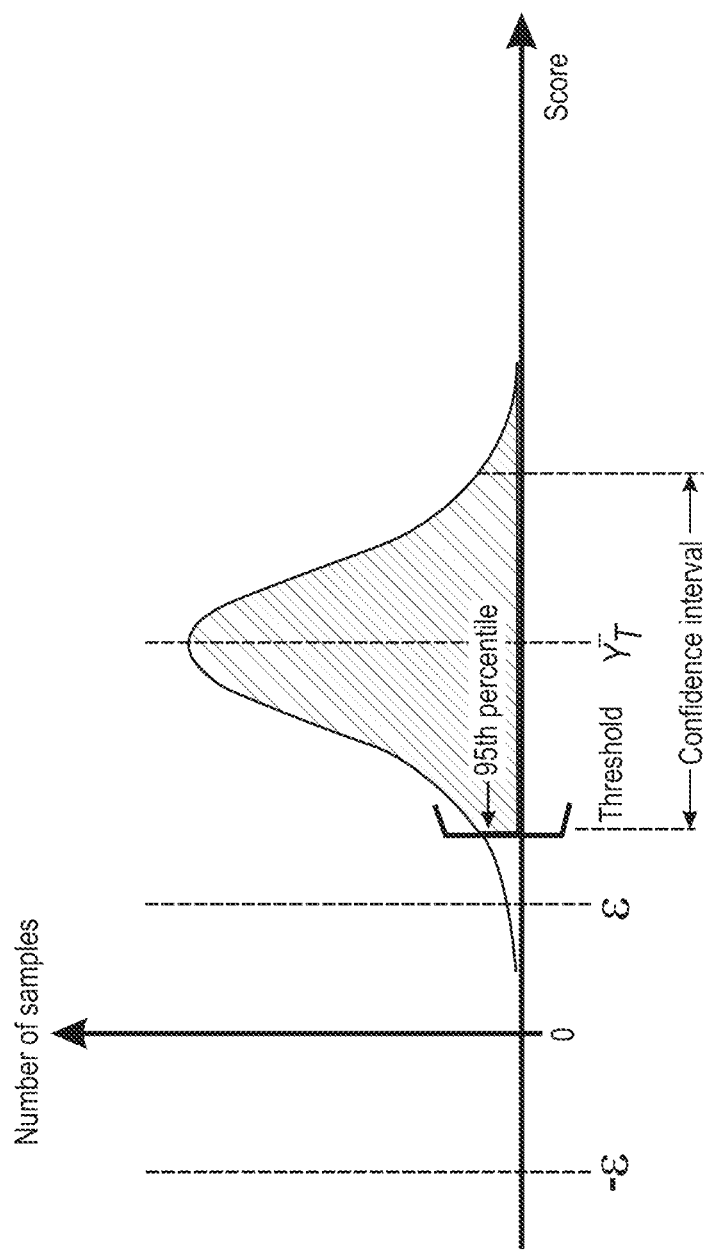
FIG. 3 Illustrates application of a stopping criterion, for the positive case.
Figure 4A:
FIG. 4 illustrates example images processed by an exemplary prototype system.
Figure 4B:
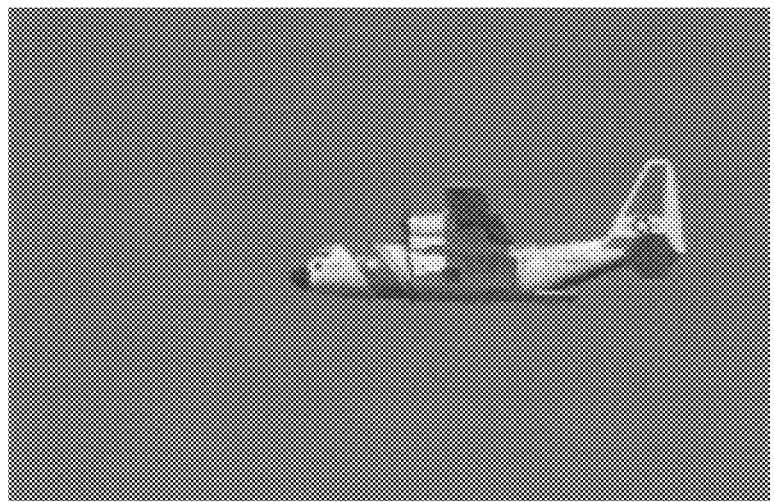
Figure 4C:
Figure 4D:
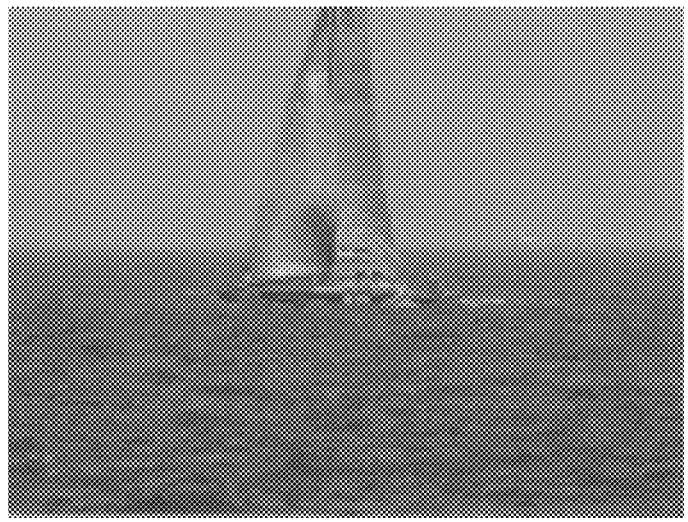

In the present case, the aim at S116–S118 is to establish when there is enough evidence to take a reliable decision for the classification problem. In other words, the object is to know with probability above $\alpha$ that the global score $\mu$ is larger than a threshold $\epsilon$ (for the positive class), or smaller than $-\epsilon$ (for the negative class). Once one of these criteria is reached, the classification process can be stopped. These values are illustrated in FIG. 3, where the distribution of number of samples over a range of local scores is exemplified for a document in the positive class.

It will be appreciated that results obtained for confidence intervals can be extended to only the lower or the upper bound. By symmetry, $p(-A(\alpha,T)<\mathcal{T}_T<A(\alpha,T))=\alpha$ is equivalent to $p(\mathcal{T}_T<A(\alpha,T))=1/2+\alpha/2$. A new early stopping function $B(\alpha,T)$ can be introduced, such that: $B(\alpha,T)=A(2\alpha-1,T)$. This allows probabilities $p(\mathcal{T}_T<B(\alpha,T))=\alpha$ and $p(\mathcal{T}_T>-B(\alpha,T))=\alpha$ to be considered and to compute the one-sided $\alpha$-confidence limits of the global score.

Thus, given a target confidence $\alpha$, the function $A(\alpha,T)$ provides the two-sided bound: $p(-A(\alpha,T)<\mathcal{T}_T<A(\alpha,T))=\alpha$ while the function $B(\alpha,T)$ provides the one-sided bound: $p(\mathcal{T}_T>-B(\alpha,T))=\alpha$.

The following three cases can be distinguished:

1. The estimation $\bar{Y}_T$ of the global score is between $-\epsilon$ and $\epsilon$. No conclusion about the document label can be drawn and the sampling process goes on (a NO, at S112).

2. The estimation $\bar{Y}_T$ is above $\epsilon$ (a YES, at S112). If the lower-bound of the $\alpha$-percent confidence interval for $\mu$ $$\left(\text{i.e., } \bar{Y}_T - B(\alpha,T)\frac{\bar{S}_T}{\sqrt{T}}\right)$$

is above $\epsilon$, the document can be classified as positive with probability $\alpha$ (illustrated in FIG. 3, where the confidence threshold is set at $\alpha$=95% confidence). Otherwise, the sampling process goes on (a NO, at S118).

3. The estimation $\bar{Y}_T$ is below $-\epsilon$ (a YES, at S112). If the upper-bound of the $\alpha$-percent confidence interval for $\mu$ $$\left(\text{i.e., } \bar{Y}_T - B(\alpha,T)\frac{\bar{S}_T}{\sqrt{T}}\right)$$

is below $-\epsilon$, the document can be classified as negative with probability $\alpha$. Otherwise, the sampling process goes on (a NO, at S118).

When the lower bound (resp. upper bound) of the confidence interval is larger than $\epsilon$ (resp. lower than $-\epsilon$) for the desired probability $\alpha$, the estimation ($\bar{Y}_T=\hat{\mu}$) of the score $\mu$ is good enough.

Algorithm and Exemplary Implementation Details

The method illustrated in FIG. 2 can be implemented in an algorithm which takes two parameters as input: $\epsilon$ and $\alpha$. After each extraction of a descriptor $x_T$ and the computation of its local score $y_T$, the algorithm computes, on-the-fly, if the current number T of extracted samples allows taking a decision, i.e., if the global score is above $\epsilon$ (resp. below $-\epsilon$) with a probability of at least $\alpha$. The pseudo code of the algorithm is shown in Algorithm 1. $T_{max}$ represents the maximum number of samples which can be extracted—i.e., it provides a stopping criterion if the early stopping method is unable to assign a decision.

Algorithm 1: Efficient classification of a
document with early stopping:

Require: $\epsilon \geq 0$
Require: $\alpha \in [0,1]$
Ensure: classification label
1:   T := 0
2:   $a_1$ := 0
3:   $a_2$ := 0
4:   while T < $T_{max}$ do
5:     increment T
6:     extract $x_T$
7:     compute $y_T = f(x_T)$
8:     $a_1$ += $y_T$
9:     $a_2$ += $(y_T)^2$
10:    $$\overline{Y}_T = \frac{a_1}{T}$$
11:    if $-\epsilon < \overline{Y}_T < \epsilon$ then
12:      continue (i.e., go back to step 4)
13:    end if
14:    compute
       $$\overline{S}_T^2 = \frac{a_2 - T\overline{Y}_T^2}{T-1}$$
15:    compute $B(\alpha,T)$
16:    if $\overline{Y}_T > \epsilon$ then
(Positive class)
17:      $$\text{LowBound} := \overline{Y}_T - \frac{B(\alpha, T)\overline{S}_T}{\sqrt{T}}$$
18:      if LowBound > $\epsilon$ then
19:        return positive class
20:      else
21:        continue (i.e., go back to step 4)
22:      end if
23:    else
(Negative class)
24:      $$\text{upperBound} := \overline{Y}_T + \frac{B(\alpha, T)\overline{S}_T}{\sqrt{T}}$$
25:      if upperBound < $-\epsilon$ then
26:        return negative class
27:      else
28:        continue
29:      end if
30:    end if
31:  end while
32:  return unknown class Further details on the different steps of the algorithm are now provided.

The algorithm is initialized with a selected value of the probability a and with thresholds on the global score $\epsilon$ (and $-\epsilon$) (S102). For example, $\alpha$=0.95 is stored, if a 95% confidence is desired. The values of $\epsilon$ (and $-\epsilon$) may depend on the range of possible scores and on other factors, such as the reliability of the classifier, the desired accuracy or precision of the system, and so forth. For example, if the scores are output in the range [−1,+1], then $\epsilon$ could be, for example, 0, 0.2, 0.5 or the like. As $\epsilon$ increases, of course, fewer documents are likely to receive a label as "positive" or "negative" and are more likely to be classed as "unknown" or a larger number of samples may need to be drawn before a decision is made.

Note that the algorithm above goes through a positive class loop or a negative class loop, depending on whether $\overline{Y}_T$ is greater than $\epsilon$ or less than $-\epsilon$. The method then computes whether the lower (resp. upper) bound is above (resp. below) the threshold value $\epsilon$, and if so, renders a decision. Otherwise the method returns to Step 4 of the algorithm.

The proposed method exemplified in Algorithm 1 is beneficial (in terms of cost savings) if (a) the process can be stopped after extracting only a small percentage of the local features and (b) step 6 represents a significant percentage of the computational cost. In both the text and image document cases, assumption b) is clearly the case. Indeed, cost savings can be achieved even when a relatively large percentage of samples are processed before a decision can be made.

Step 7 (S108) can be computed extremely efficiently in the BoW/BoV example by noting that $x_t$ has a single non-zero binary entry, irrespective of the number of dimensions in the vector. For example, the sample of a text document can be one word of the document, which is assigned to the respective feature in the histogram. In the case of an image, the sample can be a single patch which is assigned to a single visual word. In the case of other image representations (e.g., FV, VLAD, SV), $X_T$ is still very sparse (but has, in general, more than one non-zero entry) and $f(x_t)$ can still be computed efficiently.

Use of Accumulators:

While not essential, the following accumulators $$a_1 = \sum_{t=1}^{T} y_t \text{ and } a_2 = \sum_{t=1}^{T} y_t^2$$

may be used to compute $\overline{Y}_T$ and $\overline{S}_T^2$ efficiently. See Steps 8 and 9 of the algorithm, where these accumulators are incremented by adding, to the sum computed so far, the additional value(s) of $y_t$ or $y_t^2$ computed at Step 7 (see steps 8 and 9). The reason for computing $a_2$ is that it can be used to compute the estimate of the variance, since:

$$\overline{S}_T^2 = \frac{1}{T-1} \sum_{t=1}^{T} (y_t - \overline{Y}_T)^2 = \frac{1}{T-1} \sum_{t=1}^{T} y_t^2 - \frac{T}{T-1} \overline{Y}_T^2 \quad (9)$$

i.e., $$\overline{S}_T^2 = \frac{a_2 - T\overline{Y}_T^2}{T-1}$$

(Step 14 of the algorithm).

This avoids the need to use Equation (4), which can incur a somewhat greater computational cost.

Computation of B:

Step 15 can be implemented efficiently by using one or more pre-computed look-up tables or other data structure containing the values of the cumulative distribution of the t-distribution $\mathcal{T}_t$ for a target $\alpha$ and various values of T. See, for example, the values in TABLE 1 below. As will be appreciated, values of B may be computed and stored for each value of T up to the total number of samples and for one or more predefined values of $\alpha$.

TABLE 1

Values of B as a function of α and T

| T (number of samples drawn) | Target α | | | | | | | |
|---|---|---|---|---|---|---|---|---|
| 1 Sided | 75% | 80% | 85% | 90% | 95% | 99% | 99.5% | 99.9% |
| 2 Sided | 50% | 60% | 70% | 80% | 90% | 98% | 99% | 99.8% |
| 1 | 1.000 | 1.376 | 1.963 | 3.078 | 6.314 | 31.82 | 63.66 | 318.3 |
| 2 | 0.816 | 1.061 | 1.386 | 1.886 | 2.920 | 6.965 | 9.925 | 22.33 |
| 5 | 0.727 | 0.920 | 1.156 | 1.476 | 2.015 | 3.365 | 4.032 | 5.893 |
| 10 | 0.700 | 0.879 | 1.093 | 1.372 | 1.812 | 2.764 | 3.169 | 4.144 |
| 15 | 0.691 | 0.866 | 1.074 | 1.341 | 1.753 | 2.602 | 2.947 | 3.733 |
| 20 | 0.687 | 0.860 | 1.064 | 1.325 | 1.725 | 2.528 | 2.845 | 3.552 |
| 25 | 0.684 | 0.856 | 1.058 | 1.316 | 1.708 | 2.485 | 2.787 | 3.450 |
| 30 | 0.683 | 0.854 | 1.055 | 1.310 | 1.697 | 2.457 | 2.750 | 3.385 |
| 40 | 0.681 | 0.851 | 1.050 | 1.303 | 1.684 | 2.423 | 2.704 | 3.307 |
| 50 | 0.679 | 0.849 | 1.047 | 1.299 | 1.676 | 2.403 | 2.678 | 3.261 |
| 60 | 0.679 | 0.848 | 1.045 | 1.296 | 1.671 | 2.390 | 2.660 | 3.232 |
| 80 | 0.678 | 0.846 | 1.043 | 1.292 | 1.664 | 2.374 | 2.639 | 3.195 |
| 100 | 0.677 | 0.845 | 1.042 | 1.290 | 1.660 | 2.364 | 2.626 | 3.174 |
| 120 | 0.677 | 0.845 | 1.041 | 1.289 | 1.658 | 2.358 | 2.617 | 3.160 |
| ∞ | 0.674 | 0.842 | 1.036 | 1.282 | 1.645 | 2.326 | 2.576 | 3.090 |

For a more detailed table, see, for example, http://en.wikipedia.org/wiki/Student%27s_t-distribution. Alternatively, the system may be linked to a computation resource which computes B on the fly using the current T and selected α as inputs.

In the exemplary case, the one-sided values are used for B, since it is generally not necessary to know whether the mean falls within the confidence interval (FIG. 3), only if it is above the threshold for the positive class (or below the threshold for the negative class) with the desired level of confidence. As will be appreciated, the stored table may include more values, and/or values may be estimated from the table by interpolation or by using the closest (e.g., lower) value of T.

For example, suppose 25 samples have been processed so far and the user has selected a 95% confidence. From Table 1, the value 1.708 is output. This value is used for B in step 15 of the algorithm, and the lower (or upper) bound in step 17 (or step 24) of the algorithm.

Alternative Embodiments

While the previous description provides one example embodiment, the following alternatives are also contemplated:

1. In the algorithm, lines 10 to 30 do not need to be run after every local score computation, e.g., the confidence test can be run only every few samples according to a schedule. As an example, schedules for this test may include linear (e.g., every 10 samples), quadratic, or exponential schedules.

2. Rather than using a fixed predefined schedule, in one embodiment the method may involve estimating a minimum value of T needed to be α-confident (S122). Assume that a goal is to verify that the document indeed corresponds to the correct class. Let T* represent the minimum value such that:

$$\epsilon = \overline{Y}_{T^*} - B(\alpha, T^*) \overline{S}_{T^*} / \sqrt{T^*}. \quad (10)$$

This yields:

$$T^* = \left( \frac{B(\alpha, T^*) \overline{S}_{T^*}}{\overline{Y}_{T^*} - \epsilon} \right)^2. \quad (11)$$

Assuming that $\overline{Y}_T$ and $\overline{S}_T$ are fairly independent of T (which is reasonable enough for large values of T, i.e., when a large number of samples have already been observed) and given that $B(\alpha, T)$ is a decreasing function of T (this is a guaranteed property), then approximately:

$$\left( \frac{B(\alpha, \infty) \overline{S}_T}{\overline{Y}_T - \epsilon} \right)^2 \leq T^* \leq \left( \frac{B(\alpha, T) \overline{S}_T}{\overline{Y}_T - \epsilon} \right)^2. \quad (12)$$

where T is the current number of samples processed.

This gives an approximate interval for T* and the schedule for increasing T can be updated accordingly. For example, lines 11 to 30 are not run until:

$$T_{next} = \left( \frac{B(\alpha, \infty) \overline{S}_T}{\overline{Y}_T - \epsilon} \right)^2.$$

As previously noted, B can be found from a precomputed table, as shown in Table 1. If the confidence is still insufficient to make a decision, the method is repeated until a new value of $T_{next}$ is reached.

3. In the exemplary Algorithm 1, the t-student distribution was used as the assumed distribution of samples. This gives a confidence interval for the mean of a Gaussian (normal) distribution when the variance is unknown. In an alternative method, a different distribution may be considered, for example, by taking a Bayesian view of the problem. Assuming again that the local scores are independent and identically distributed (iid) random variables and drawn from a normal distribution $\mathcal{N}(\mu, \sigma)$ where $\mu$ and $\sigma$ are themselves random variables with a prior probability $p(\mu, \sigma)$ (for example, a Normal-Wishart distribution which is the joint conjugate prior density of the Gaussian), then it is possible to compute the posterior probability:

$$p(\mu | y_1, \ldots, y_T) \propto \int_\sigma p(y_1, \ldots, y_T | \mu, \sigma) p(\mu, \sigma) d\sigma \quad (13)$$

$$\propto \int \prod_{t=1}^{T} p(y_t | \mu, \sigma) p(\mu, \sigma) d\sigma \quad (14)$$

The confidence test in this case can then be represented by:

$$p(\mu > \varepsilon \mid y_1, \ldots, y_T) = \int_{\mu=\varepsilon}^{+\infty} p(\mu \mid y_1, \ldots, y_T) d\mu. \quad (15)$$

This is the probability for μ to be above ε. If the probability is above α, there is sufficient confidence for the decision to be classed as positive. A similar equation can be cast for the negative case. As for the method illustrated in Algorithm 1, samples are drawn from the document and processed until a threshold confidence in the decision is reached.

One advantage of this approach is that, through the prior density p(μ,σ), a priori information about the distributions of local scores per class (as estimated on a training set) can be incorporated. For example, if scores from a prior use of a particular classifier are known, this information can be used to converge on the decision faster.

As will be appreciated, the system and method are not limited to a Gaussian assumption. Other choices of densities and conjugate priors are also contemplated.

As will be appreciated, as the number of classes increases, especially when dealing with very similar classes, it becomes harder to distinguish between the classes, and a larger number of samples may be needed to obtain a reliable label prediction. However, even in such cases, the method is able to make a faster decision on at least some of the images to be processed.

Without intending to limit the scope of the exemplary embodiment, the following examples demonstrate the applicability of the method to categorization of images.

EXAMPLES

A prototype system 10 using Algorithm 1 was used to test the method. For training, a large set of manually labeled photographic images was provided. Patch descriptors were extracted from patches of each of the images and used to generate a global representation of the image. A classifier was trained for each of a set of visual classes (boat, bird, bottle, car, cow, plane, . . . ) using a the labels and global representations.

Photographic images were selected which showed different types of objects. Four examples are shown in FIG. 4. Two different types of descriptor were evaluated, the Bag of Visual Words (BoV), using the method of U.S. Pub. No. 20080069456, and the Fisher Vector (FV), using the method of F. Perronnin and C. Dance, "Fisher kernels on visual vocabularies for image categorization," In CVPR, 2007. For both of these descriptors, two types of local features (color and gradient features) were extracted from each patch and quantized into visual words. The global representation was then generated by aggregating the per patch statistics. The global representation was then input into a classifier (which in some cases, was the same as the ground truth of the image, and in others, was one of the other classifiers). Additionally, the exemplary method using early stopping was applied, where patches were extracted and algorithm 1 applied until there was sufficient confidence in the decision. For these examples, α=0.99 and ε=0.1. The number of patches extracted when the early stopping criterion is met and the estimated score are shown in TABLE 2. This is compared to the total number of patches extracted with the comparative method with the final global score produced using all patches (full computation). GT=ground truth label of the image.

TABLE 2

| Image | Descriptor | Ground Truth | Classifier | Early Stopping | | Full Computation | |
|---|---|---|---|---|---|---|---|
| | | | | No. of samples | Est. of global score | No. of samples | Final global score |
| a | BOV | car | car | 5800 | 0.13 | 9209 | 0.89 |
| b | BOV | plane | plane | 800 | 6.98 | 9209 | 6.17 |
| c | FV | sofa | sofa | 5100 | 1.71 | 9183 | 2.32 |
| d | FV | boat | boat | 500 | 2.50 | 9282 | 2.15 |
| a | BOV | car | cow | 2700 | −3.36 | 9209 | −3.33 |
| b | BOV | plane | bird | 2000 | −3.71 | 9209 | −3.74 |
| c | FV | sofa | plane | 800 | −1.07 | 9183 | −1.27 |
| d | FV | boat | bottle | 100 | −2.08 | 9282 | −2.55 |

As can be seen from TABLE 2, there are considerable savings in extracting of features when the early stopping criteria are applied. In the first four, the aim was to see how fast the images can be classed as "positive" and in the second four, how fast they can be classified as "negative." In all cases, the early stopping method was able to predict the final decision which would be made, when all the samples had been processed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A document processing method comprising:
   incrementally,
      for each of a set of samples of a document, extracting local features from the sample;
      for each of the samples, computing a local score based on the local features extracted from the sample;
      estimating a global score for the document based on the local scores currently computed; and
      computing a confidence in a decision for the estimated global score, the computed confidence being based on the local scores currently computed; and
   outputting a decision for the document based on the estimated score when the computed confidence in the decision reaches a threshold value, the extracting of local features, computing the local score, estimating of the global score, and the computing of the confidence in the decision being repeated with additional samples until the computed confidence in the decision reaches the threshold value.

2. The method of claim 1, wherein at least one of the computing of the local score, estimating of the global score, computing of the confidence in the decision, and outputting of the decision is performed with a processor.

3. The method of claim 1, wherein the computing of the confidence in the decision is also based on a number of the samples used in computing the estimated global score.

4. The method of claim 1, wherein the decision for the document is based on the estimated global score having reached a threshold value.

5. The method of claim 4, wherein the decision for the document is based on the document score being higher or lower than the threshold value.

6. The method of claim 4, further comprising computing at least one of a lower bound and an upper bound of a distribution of the local scores currently computed and wherein the decision for the document is based on the lower bound of a distribution of the local scores currently computed being above the threshold value for the estimated global score or the upper bound of a distribution of the local scores currently computed being below the threshold value for the estimated global score.

7. A document processing method comprising:
incrementally, for each of a set of samples of a document, computing a local score based on local features extracted from the sample;
estimating a global score for the document based on the local scores currently computed;
computing a confidence in a decision for the estimated global score, the computed confidence being based on the local scores currently computed;
computing at least one of a lower bound and an upper bound of a distribution of the local scores currently computed, comprising accessing a data structure which stores values of a parameter $B(\alpha,T)$ for different numbers of samples and a preselected value of the confidence in the decision and,
if $\overline{Y}_T > \epsilon$ computing the lower bound according to:

$$LowBound := \overline{Y}_T - \frac{B(\alpha, T)\overline{S}_T}{\sqrt{T}};$$

if $\overline{Y}_T < -\epsilon$ computing the upper bound according to:

$$upperBound := \overline{Y}_T + \frac{B(\alpha, T)\overline{S}_T}{\sqrt{T}},$$

where $\overline{Y}_T$ is the estimated global score, $[\overline{S}_T]^2$ is an unbiased estimate of the variance of the distribution of the samples used in estimating the global score, $\epsilon$ is the threshold value for the estimated global score, and T is the number of samples used in estimating the global score; and
outputting a decision for the document based on the estimated score when the computed confidence in the decision reaches a threshold value, the decision for the document being based on the computed lower bound of the distribution of the local scores currently computed being above the threshold value for the estimated global score or the computed upper bound of the distribution of the local scores currently computed being below the threshold value for the estimated global score.

8. The method of claim 1, wherein the estimated global score is computed as a function of the aggregated local scores and a number of the samples whose local scores are aggregated.

9. The method of claim 1, wherein the confidence computation is based on an assumption that the sample scores follow a predictable distribution.

10. The method of claim 9, wherein the confidence computation is based on a t-student test.

11. The method of claim 1, wherein the decision comprises at least one of a categorization decision and a retrieval decision.

12. The method of claim 11, wherein the decision comprises a categorization decision and the method comprises computing a decision based on the estimated global score and a class model which has been trained to categorize documents based on an aggregate of their local scores.

13. The method of claim 1, wherein the document comprises at least one of a text document and an image.

14. The method of claim 1, further comprising, for at least one value of confidence in the decision, storing a set of values for an early stopping function for different values of the number of samples, and wherein the computing of the confidence in a decision is based on the early stopping function value for the current value of the number of samples.

15. The method of claim 1, further comprising stopping the computing of the local score when the estimated global score also has reached a threshold value.

16. The method of claim 1, further comprising computing a first accumulator as a current aggregate of the local scores computed so far and storing the first accumulator, the estimated global score being a function of the first accumulator and a number of samples in the current aggregate.

17. The method of claim 1, further comprising computing a second accumulator as a current aggregate of the square of each of the local scores computed so far and storing the second accumulator for computing a variance estimate of the local scores computed so far, the variance estimate being used to determine whether the estimated global score is at least a threshold value.

18. The method of claim 1, further comprising, based on the local scores for samples computed so far, estimating a number of additional samples for which local features are still to be extracted and the local score is still to be computed and reestimating the global score for the document and recomputing the confidence in the decision when the local scores for that number of samples have been computed.

19. The method of claim 1, further comprising reestimating the global score at least once and recomputing the confidence in the decision at least once until the computed confidence in the decision is at least the threshold value and the estimated global score is at least a threshold value.

20. The method of claim 1, wherein the computing of the local score further comprises, for each sample, extracting features from the sample and generating a descriptor based on the extracted features, the local score being based on the descriptor.

21. The method of claim 20, wherein the descriptor represents a statistical distribution of the extracted features.

22. A document processing system comprising:
memory which stores instructions for performing the method of claim 1; and
a processor in communication with the memory for executing the instructions.

23. A computer program product comprising a non-transitory storage medium storing instructions which, when executed by a computer, perform the method of claim 1.

24. A document processing system comprising:
a descriptor generator which, progressively, for each of a set of samples of a document, generates a local descriptor based on features extracted from the sample of the document;
a scoring component which incrementally estimates a global score for the document based on the local descriptors currently computed for the set of samples of the document;
a confidence computing component which computes a confidence in a decision for the estimated global score, the computed confidence being based on the local descriptors currently computed and optionally the number of the samples used in computing the estimated global score;
a decision output component which outputs a decision for the document based on the estimated score when the computed confidence in the decision reaches a threshold value, wherein the generating of the local descriptor based on features extracted from the sample of the document, the estimating of the global score, and the computing of the confidence in the decision are repeated with additional samples until the computed confidence in the decision for the document reaches the threshold value; and a processor which implements the descriptor generator, scoring component, confidence computing component, and decision output component.

25. The method of claim 24, wherein the decision output component instructs the descriptor generator to discontinue generating the local descriptors when the computed confidence in the decision reaches the threshold value and the estimated global score reaches a threshold value.

26. A document processing system including a processor and memory, which takes as input a document and outputs a decision for a class when:

an estimate of the document score for the class is higher than a threshold $\epsilon$ or lower than a threshold $-\epsilon$;

the estimated document score for the class being computed as an aggregation of local scores computed from local features;

the local features and scores being computed incrementally and used to compute a confidence in the class decision; and the extraction of the local features and local score computation being discontinued as soon as the computed confidence in the class decision exceeds a threshold $\alpha$, the memory including instructions, implemented by the processor, for incrementally extracting the local features, computing the scores, and computing the confidence in the decision.

* * * * *